US006829656B1

United States Patent
Szucs et al.

(10) Patent No.: US 6,829,656 B1
(45) Date of Patent: Dec. 7, 2004

(54) TUNER FCM FOR HAVI ARCHITECTURE

(75) Inventors: Paul Szucs, Ostfildem (DE); Stephen Tiedemann, Stuttgart (DE); Andreas Schwager, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/565,110

(22) Filed: May 4, 2000

(30) Foreign Application Priority Data

May 5, 1999 (EP) .............................. 99108916

(51) Int. Cl.⁷ .............................................. G06F 15/16
(52) U.S. Cl. ...................... 709/250; 709/246; 719/328; 725/100; 725/137; 725/139; 700/83
(58) Field of Search ................................ 709/246, 250, 709/328; 700/83; 725/100, 137, 139; 719/328

(56) References Cited

FOREIGN PATENT DOCUMENTS

| EP | 0 893 913 | 1/1999 |
| EP | 0 908 821 | 4/1999 |
| WO | WO 98 16886 | 4/1998 |

OTHER PUBLICATIONS

Database Internet Online! HAVi Nov. 19, 1998 *"The HAVi Specification–Version 1.0.beta"*, Oct. 11, 1999, p. 1–p. 22, p. 214–p. 220, XP002118795.

Banks D et al: *"Breaking Open the Set Top Box"* Proceedings of the SPIE, vol. 3228, Nov. 4, 1997, pp. 105–116, XP002064906.

Database Internet Online! 1394 Trade Association—The Multimedia Connection Apr. 15, 1998 *"AVIC Turner Model and Command Set–Version 1.0"* XP002118833.

Evain J–P: *"The Multimedia Home Platform"* EBU Review–Technical, No. 275, Mar. 21, 1998, pp. 4–10, XP000767493.

Itoh J–I et al: *"A New Software Architecture for Evolvable Multimedia Software"* European Transactions on Telecommunications, vol. 8, No. 4, Jul. 1, 1997, pp. 423–435, XP000695449.

*Primary Examiner*—Anthony Knight
*Assistant Examiner*—Thomas Pham
(74) *Attorney, Agent, or Firm*—Frommer Lawrence & Haug LLP; William S. Frommer; Dennis M. Smid (57) ABSTRACT

A tuner component module within a home network based on the HAVI standard, i.e. a tuner FCM, according to the present invention includes the funtionality to provide the capability of the tuner and/or to introduce the DVB/DTV concepts of components and events to the HAVi network. In this context, components could be audio, video, or data streams associated with a service and events could e.g. be information for an electronic programming guide (EPG). The capability of a tuner in this context are all functions supported by the tuner. Therefore, a tuner FCM according to the present invention includes at least one of the following APIs and the corresponding (data/signal) structures necessary to have a proper functionality: GetItemComponentList API, GetEventList API, SelectItemComponent API, GetCurrentItemComponent API and GetCapability API.

11 Claims, 1 Drawing Sheet

Fig. 1

TUNER FCM FOR HAVI ARCHITECTURE

FIELD OF THE INVENTION

This invention relates to a tuner component module within a home network, in particular within a home network based on the HAVi standard, which is adapted to support the access of transmitted items. A tuner controlled via a network is accessed in a HAVi network via its tuner component module (FCM) which presents one or more application programming interfaces (APIs) to other elements within the home network.

BACKGROUND OF THE INVENTION

Within the HAVi specification. e.g. in the version HAVi10Bn1 of Dec. 10, 1998, several APIs are defined for a tuner functional component module (tuner FCM). These APIs allow only a very simple control of a tuner device within the home network. Basically, the tuner device can only provide un-named and unspecified lists of items, i.e. services or channels, which can be selected via the network. A selected item will then be received and distributed within the network by the tuner device.

In the above identified version of the HAVi specification an item is referred to by a descriptive name thereof. The meaning of this value is dependent on the tuner. An item could e. g. be the channel number, the service name or the frequency for a certain service. Each item is uniquely identified by a predefined index number. A GetItemList API returns a list of items and indexes available from the tuner. A SelectItem API allows the selection of an item which is identified by its index number and causes the output of said selected item by the tuner to a specified plug. Output in this sense means to append or remove the selected item to/from the data stream to this specified plug. A GetCurrentItem API returns a list of items and indexes currently being output to a specified plug and an ItemChanged API notifies a change in items of a specified plug. Furtheron, a tuner notification attribute itemSelection is defined which provides new settings of item selections on the tuner output plug.

SUMMARY OF THE INVENTION

Therefore, the object of the present invention to provide a tuner component module providing an improved control of a tuner in the home network. This object is solved by a tuner component module according to claim 1 which has means to access at least one component and/or event transmitted within one item and/or to show its capability.

Therefore, according to the present invention a tuner component module adapted to the HAVi standard. i.e. a tuner FCM, includes the functionality to provide its capability and/or to introduce the DVB/DTV concepts of components and events to the HAVi network. In this context components could audio, video or data streams associated with a service and events could e. g. be information for an electronic programming guide (EPG). The capability of the tuner component module in this context are all supported functions.

Preferred embodiments of the present invention are defined in the subclaims 2 to 11 which define APIs for the access of components and events as well as a structure providing the kind of an item, such as TV, radio or data.

DETAILED DESCRIPTION OF THE PRESENT INVENTION

In the following a descriptive example of a tuner component module according to the present invention will be given. Such a tuner FCM can be realized in hardware as described in connection with the first preferred embodiment of the present invention shown in FIG. 1 or in software as described in connection with the second preferred embodiment of the present invention.

Figure 1:
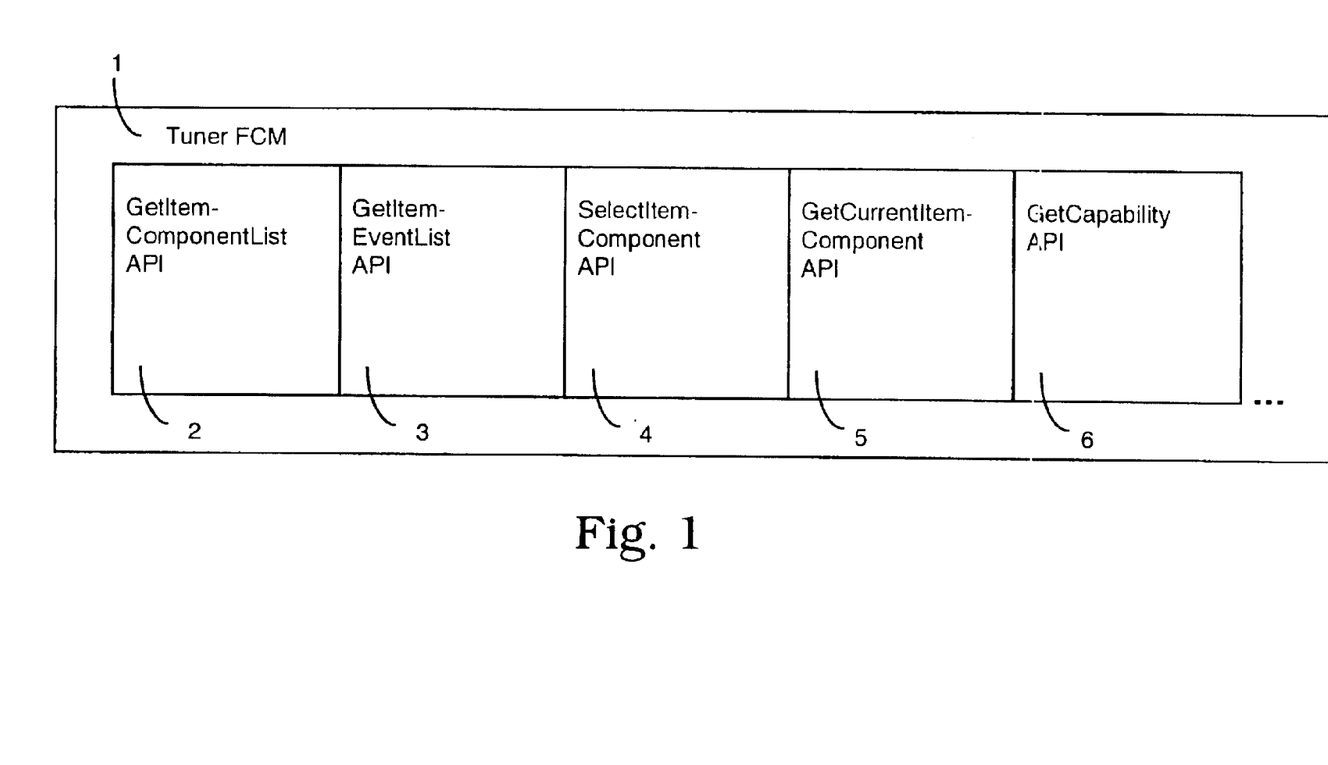
FIG. 1 depicts a Tuner FCM in accordance with an embodiment of the present invention.

To be able to specify an item besides its name or channel/frequency the tuner FCM 1 according to the first preferred embodiment of the present invention which is shown in FIG. 1 defines an item type additionally to the structure, the APIs, the events and notifications defined in a tuner FCM according to the above indicated version of the HAVi standard. Such a type could e.g. indicate that a certain item is used for an audio service, an audio/video service or a data service. Furtheron, a type ensemble can refer to a collection of items, generally meaning the complete multiplex or channel the receiver being tuned to. Such a categorisation of items allows a more specified access.

Furtheron, the tuner component module 1 according to the present invention introduces the concepts of components and events known from DVB and DTV to HAVi. Therefore, it defines a component type that allows the definition of certain components within one item, such as a video component, an audio component, a subtitle component, a teletext component, or a data component. Of course, one item can comprise several components of one type. Additionally an index is provided to uniquely identify a component.

Both, components and events for a particular item available from the tuner, e. g. the item currently being output by the tuner, can be collected in a respective list which can be requested similar as the item list already specified within the above identified version of the HAVI specification. Therefore, the tuner FCM 1 according to the present invention includes a GetItemComponentList API 2 to collect and output a list of components and corresponding indexes of a particular item available from the tuner and a GetItemEvenList API 3 to collect and output a list of events carried by a particular item available from the tuner.

Every component of an item can be selected with the help of its index via a SelectItemComponent API 4. A selected item component is then caused to be output by the tuner. Of source, not only one component of one item can be selected at a time, but several can be selected simultaneously, as it would be the case of reception and distribution of a video stream as e.g. first component of an item 'ARD' and a first audio stream as e.g. third component 'original language' corresponding to said video stream. The second component which is received by the tuner, but not distributed within the network, since it is not selected could e.g. be an audio stream of the 'german translation' corresponding to the video stream.

A GetCurrentItem API 5 returns a list of components and indexes of one or more item(s) currently being output by the tuner device to a specified plug.

Furtheron, besides the possibility to access components of an item with the help of the component and/or index also the access of events with the help of an event index is possible according to the present invention. In this case access includes not the selection of an event, since an event is used for information purposes only. Therefore, only a list of events carried by a particular item available from the tuner will be returned from the GetItemEvenList API 3 as described above.

A further advantage of the present invention is the provision of the tuner FCM capability which can be requested via a GetCapability API 6 and which is output in a list similar to e. g. the VCR FCM capability already defined in chapter 6.2 of the above identified version of the HAVi specification.

In the following the tuner services, tuner data structures, tuner APIs, tuner events and tuner notification attributes are shown as they could be specified in chapter 6.1 of a further version of the HAVi specification or in a software version of a tuner FCM according to a second preferred embodiment of the present invention. The tuner services, tuner data structures, tuner APIs and tuner notification attributes which are new in comparision with chapter 6.1 of the above identified version of the HAVi specification are indicated by a *–sign.

6.1 Tuner FCM
6.1.1 Tuner Services

| Service | Comm Type | Locality | Access | Resv Prot |
|---|---|---|---|---|
| Tuner::GetItemList | M | global | all | |
| Tuner::GetItemComponentList* | M | global | all | |
| Tuner::GetItemEventList* | M | global | all | |
| Tuner::SelectItem | M | global | all | yes |
| Tuner::SelectItemComponent* | M | global | all | yes |
| Tuner::GetDataList | M | global | all | |
| Tuner::SelectData | M | global | all | yes |
| Tuner::GetCurrentItem | M | global | all | |
| Tuner::GetCurrentItemComponent* | M | global | all | |
| Tuner::GetCurrentData | M | global | all | |
| Tuner::GetCapability* | M | global | all | |
| ItemChanged | E | global | Tuner (all) | |

6.1.2 Tuner Data Structures

ItemType enumerator*
enum ItemType{ ITEM_ADSERVICE,
              ITEM_AUDIOSERVICE,
              ITEM_DATASERVICE,
              ITEM_ENSEMBLE,
              ITEM_UNSPECIFIED,
        };
ItemIndex
struct ItemIndex {
    ushort       Index;
    ItemType    itemType;
    String      Item;
};

| Element | Description |
|---|---|
| Index | The number of the index to uniquely identify the Item below. |
| ItemType | Categorization of item. There are three types of item defined for services. The type Ensemble can refer to a collection of items, generally meaning the complete multiplex or channel being tuned to. |
| Item | A descriptive name of the item. |

ItemIndexList
typedef sequence<ItemIndex> ItemIndexList;
ComponentType enumerator*
enum ComponentType{ COMPONENT_VIDEO,
                    COMPONENT_AUDIO,
                    COMPONENT_SUBTITLE,
                    COMPONENT_TELETEXT,
                    COMPONENT_DATA,
                    COMPONENT_UNSPECIFIED,
        };
ComponentIndex*
struct ComponentIndex {
    ushort            Index;
    ComponentType  componentType;
    String           Component;
};

| Element | Description |
|---|---|
| Index | The number of the index to uniquely identify the Component below. |
| componentType | Categorization of component |
| Component | A descriptive name of the component. |

-continued

```
ItemComponentIndexList*
typedef sequence<ComponentIndex> ItemComponentIndexList;
EventIndex*
struct EventIndex {
    ushort      Index;
    String      EventName;
    DateTime    StartTime;
    DateTime    Duration;
    String      EventDescription;
};
```

| Element | Description |
| --- | --- |
| Index | The number ot the index to uniquely identify the Event below within the service. |
| EventName | A descriptive name of the event. |
| StartTime | Start date & time of event |
| EndTime | End date & time of event |
| EventDescription | Text containing extended description |

```
ItemEventIndexList*
typedef sequence<EventIndex> ItemEventIndexList;
DataIndex
struct DataIndex {
    ushort      Index;
    String      Data;
};
```

| Element | Description |
| --- | --- |
| Index | The number of the index to uniquely identify the Data below. |
| Data | A descriptive name of the data, which can be the data name or the PID number and so on. The meaning of this value is dependent on the functional component (Tuner). |

```
DataIndexList
typdef sequence<DataIndex> DatIndexList;
TunerCapability enumerator*
enum TunerCapability {    CAP_GetItemComponentList,
                          CAP_GetItemEventListCurrent,
                          CAP_GetItemEventListCurrentNext,
                          CAP_GetItemEventListDay,
                          CAP_GetItemEventListWeek,
                          CAP_GetItemEventListAll,
                          CAP_SelectItemComponent,
                     };
TunerCapabilityList*
typedef sequence<TunerCapability> TunerCapabilityList;
```

6.1.3 Tuner API

Tuner::GetItemList
Prototype
Status Tuner::GetItemList(
    in uchar listNumber,
    out ItemIndexList itemIndexList)
    Parameters
listNumber      : Specifies the list number of the index list to be returned.
itemIndexList   : A list of items and indexes. The definitions of this ItemIndexList
                  list and the ItemIndex structure are described above.
Description
This API returns a list of items and indexes, in accordance with the ListNumber. These indexes within
the list can be used when issuing the Tuner::SelectItem API.
The Tuner may hold several lists internally. The usage of lists is dependent on the Tuner. The example
of listNumber and its relationships with the items are illustrated below.
Ex1) Item is used as (preset or preferred) channel number.
The preset channel numbers are area (and/or broadcast system) dependant, and independent of the
tuner. Thus, these numbers are the same between each tuner in the same area (and/or broadcast system).
In most case, the preferred channel numbers are a collection of user preference items. Thus, these
numbers may not be the same between each tuner.

-continued

| Tuner type | Item format | Meaning (example) |
|---|---|---|
| all types | character string | "888" = 888 CH |

Ex2) Item is used as (preset or preferred) item name (service name).

| Tuner type | Item format | Meaning (example) |
|---|---|---|
| all types | Character string | "BBC" = BBC service |

Ex3) Item is used as frequency.

| Tuner type | Item format | Meaning (example) |
|---|---|---|
| Analog Audio (AM) | Character string | "1234" = 1234 kHz |
| Analog Audio (FM) | Character string | "123.4" = 123.4 MHz |

Ex4) item is used as VCH.

| Tuner type | Item format | Meaning (example) |
|---|---|---|
| ATSC (US-DTV) | Area(3digits)<br>+ Major CH# (3digits)<br>+ Minor CH# (3digits) | "001023004" =<br>Area number: 1<br>Major CH#: 23<br>Minor CH#: 4 |

Error codes  
Tuner::ENOT_SUPPORTED - if the target device does not support the specified list number.  
Tuner::SelectItem  
Prototype  
Status Tuner::SelectItem(  
    in short index, in short plug, in short action)  
Parameters  
index            : Specifies the index number of the item to be selected.  
plug             : Number of plug to output the above item to.  
action          : Specifies the action to be carried out on the output signal. The following values can be set.

| Definition | Value and Meaning |
|---|---|
| APPEND | 0x0000: Add (multiplex) the specified item to the output signal. |
| REPLACE | 0x0001: Remove all current items from the output signal, and output the specified item. |
| REMOVE | 0x0002: Remove the specified item from the output signal. |
| CLEAR | 0x0003: Stop the output of all items on the specified plug. In this case, the Index parameter may be a NULL value. |

Description  
This API selects the items, which are identified by Index, and outputs (appends or removes, etc) it to the specified plug.  
Error codes  
Tuner::EREJECTED - if the REMOVER/REPLACE/CLEAR action is specified when the item is not present on the specified plug.  
Tuner::GetItemComponentList*  
Prototype  
Status Tuner::GetItemComponentList(  
    in short itemIndex,  
    out ItemComponentIndexList itemComponentIndexList)  
Parameters  
itemIndex                : item index for which component info is required.  
itemComponentIndexList   : A list of item components and indexes.  
Description  
An item may consist of several components, for example a video stream and several audio streams for multiple languages. This API returns a list of components comprising all components of a particular item available from the tuner. These indexes within the list can be used when issuing the Tuner::SelectItemComponent API.  
Tuner::SelectItemComponent*  
Prototype  
Status Tuner::SelectItemComponent(  
    in short itemIndex, in short itemComponentIndex, in short plug,  
    in short action)  
Parameters  
itemIndex                : Specifies the index of the item for which the component is to be selected.

-continued

| | |
|---|---|
| itemComponentindex | : Specifies the index of the component to be selected. |
| plug | : Number of plug to output the above item to. |
| action | : Specifies the action to be carried out on the output signal. |

The following values can be set.

| Definition | Value and Meaning |
|---|---|
| APPEND | 0x0000: Add (multiplex) the specified component to the output signal. |
| REPLACE | 0x0001: Remove all current components from the output signal, and output the specified item. |
| REMOVE | 0x0002: Remove the specified component from the output signal. |

Description
This API selects the item component identified by Index, and outputs (appends or removes, etc) it to the specified plug. The relevant item must already be selected.
Error codes
Tuner::EREJECTED - if the REMOVE/REPLACE/CLEAR action is specified when the item is not present on the specified plug.
Tuner::GetItemEventList*
enum EventInfoLevel{ EV_CURRENT,
 EV_CURRENTNEXT,
 EV_TODAY,
 EV_WEEK,
 EV_ALL,
 };
Prototype
Status Tuner::GetItemEventList(
 in short itemIndex, in EventInfoLevel eventInfoLevel,
 out ItemEventIndexList itemEventIndexList)
Parameters

| | |
|---|---|
| itemIndex | : service index for which event info is required. |
| eventInfoLevel | : amount of event information required, as defined above. |
| itemIndex | : item index for which event info is required. Special reserved |
| itemEventIndexList | : A list of events and indexes. The definitions of this list and the itemEventIndex structure are described above. |

Description
This API returns a list of events (content items) carried by a particular item available from the tuner. These lists are for information only; no selection is possible on an event.
Tuner::GetDataList
Prototype
Status Tuner::GetDataList(
 out DataIndexList dataIndexList)
Parameters

| | |
|---|---|
| dataIndexList | : A list of data (such as PID) and indexes. The definitions of this DataIndexList list and the DataIndex structure are described above. |

Description
This API returns a list of data (strings - such as a data name or PID number) and indexes. These indexes within the list can be used when issuing the Tuner::SelectData API.
Tuner::SelectData
Prototype
Status Tuner::SelectData(
 in ushort index, in short plug,
 in short action, in short flow)
Parameters

| | |
|---|---|
| index | : Specifies the index number of the data to be selected. |
| plug | : Number of plug to output the above data to. |
| action | : Specifies the action to be carry out on the output signal. The values allowed are the same as for the SelectItem API. |
| flow | : How the data should be transmitted. The following values can be set. |

| Definition | Value and Meaning |
|---|---|
| SEND_ONCE | 0x0000: send the data once. |
| SEND_NEW | 0x0001: send each new version of the data. |
| SEND_ALL | 0x0002: send all occurrences |

Description
This API selects the data (such as NIT or PMT), which is identified by index, and outputs (append or remove, etc.) it to the specified plug. The Flow parameter specifies the output method.
Error codes -continued Tuner::EREJECTED if the REMOVE/REPLACE/CLEAR action is specified when the data is not present on the specified plug.
Tuner::GetCurrentItem
Prototype
Status Tuner::GetCurrentItem(
    in short plug, out ItemIndexList currentItemList)
Parameters
plug : The number of the plug to return the current output of.
currentItemList : A list of items and indexes currently being output. The definitions of this ItemIndexList list and the ItemIndex structure are described above.
Description
This API returns a list of items and indexes, currently being output to the specified plug.
Tuner::GetCurrentItemComponent*
Prototype
Status Tuner::GetCurrentItemComponent(
    in short plug, in short itemIndex,
    out ItemComponentIndexList currentItemComponentList)
Parameters
plug : The number of the plug for which to return the current output.
itemIndex : The number of the item for which to return the current components.
currentItemComponentList : A list of items and indexes currently being output. The definitions of this ItemComponentIndexList list and the ItemComponentIndex structure are described above.
Description
This API returns a list of components and indexes of the item currently being output to the specified plug.
Tuner::GetCurrentData
Prototype
Status Tuner::GetCurrentData(
    in short plug, out DataIndexList currentDataList)
Parameters
plug : The number of the plug to return the current data output of.
currentDataList : A list of data and indexes currently being output. The definitions of this ItemDataList list and the DataIndex structure are described above.
Description
This API returns a list of data and indexes, currently being output to the specified plug.
Tuner::GetCapability*
Prototype
Status Tuner::GetCapability(
    out TunerCapabilityList capabilityList);
Parameters
capabilityList : A list of capabilities supported by the Tuner Functional Component Module. The definitions of this TunerCapabilityList list and the TunerCapability enumerator are described above.
Description
This API returns the capabilities of the Tuner Functional Component Module.

6.1.4 Tuner Events

ItemChanged
Prototype
void ItemChanged(
    in short plug,
    in ItemIndexList currentItemList)
Parameters
plug : The number of the plug, which notification of changes in its output are to be given.
currentItemList : A list of items and indexes currently being output (after a change occurs). The definitions of this ItemIndexList list and the ItemIndex structure are described above.
Description
This API notifies a change in items of a plug indicated by the plug parameter.

6.1.5 Tuner Notification Attributes

Tuner::ItemSelection
Attribute
struct {short, ItemIndexList} itemSelection
Description
New settings of item selections on outputplug. Only useful with comparator ANY.
Tuner::itemComponentSelection*
Attribute
struct {short, short itemIndex, ItemComponentIndexList} itemComponentSelection -continued Description
New settings of item component selections on outputplug. Only useful with comparator ANY.
Tuner::dataSelection
Attribute
struct {short, DataIndexList} dataSelection
Description
New settings of data selections on outputplug. Only useful with comparator ANY.

What is claimed is:

1. Tuner component module adapted to support the access of transmitted content items, characterized in that said tuner component module:
   is realized as a functional component module to be used in a HAVi based home network, and
   comprises functionality for accessing at least one event transmitted within one item,
   wherein said item comprises a number of events and a number of components, wherein each event provides information for an electronic programming guide, and wherein each component is an audio component, video component, subtitle component, or teletext component.

2. Turner component module according to claim 1, characterized in that said means allows the generation of a list of components comprising of all components of a particular item available from the turner.

3. Turner component module according to claim 1, characterized in that said means allows to select an item component and causes the output of said selected item component by the tuner.

4. Turner component module according to claim 1, characterized in that said means allows the generation of a list of events carried by a particular item available from the tuner.

5. Turner component module according to claim 1, characterized in that said means contains a GetCapability API (6).

6. Turner component module according to claim 1, characterized in that an item can be specified by its type.

7. Turner component module according to claim 2, characterized in that said means contains a GetItemComponentList API (2).

8. Turner component module according to claim 2, characterized in that said means allows the generation of a list of components and indexes of an item currently being output by the tuner.

9. Turner component module according to claim 3, characterized in that said means contains a SelectItemComponent API (4).

10. Turner component module according to claim 4, characterized in that said means contains a GetItemEventList API (3).

11. Turner component module according to claim 8, characterized in that said means contains a GetCurrentItemComponent API (5).

* * * * *

UNITED STATES PATENT AND TRADEMARK OFFICE
CERTIFICATE OF CORRECTION

| | | |
|---|---|---|
| PATENT NO. | : 6,829,656 B1 | |
| APPLICATION NO. | : 09/565110 | |
| DATED | : December 7, 2004 | |
| INVENTOR(S) | : Andreas Schwager et al. | |

It is certified that error appears in the above-identified patent and that said Letters Patent is hereby corrected as shown below:

Claims:

Claim 2, line 1,
Change "Turner" to --Tuner--.

Claim 3, line 1,
Change "Turner" to --Tuner--.

Claim 4, line 1,
Change "Turner" to --Tuner--.

Claim 5, line 1,
Change "Turner" to --Tuner--.

Claim 6, line 1,
Change "Turner" to --Tuner--.

Claim 7, line 1,
Change "Turner" to --Tuner--.

Claim 8, line 1,
Change "Turner" to --Tuner--.

Claim 9, line 1,
Change "Turner" to --Tuner--.

Claim 10, line 1,
Change "Turner" to --Tuner--.

UNITED STATES PATENT AND TRADEMARK OFFICE
CERTIFICATE OF CORRECTION

PATENT NO. : 6,829,656 B1
APPLICATION NO. : 09/565110
DATED : December 7, 2004
INVENTOR(S) : Andreas Schwager et al.

It is certified that error appears in the above-identified patent and that said Letters Patent is hereby corrected as shown below:

Claim 11, line 1,
Change "Turner" to --Tuner--.

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 6,829,656 B1 |
| APPLICATION NO. | : 09/565110 |
| DATED | : December 7, 2004 |
| INVENTOR(S) | : Andreas Schwager et al. |

It is certified that error appears in the above-identified patent and that said Letters Patent is hereby corrected as shown below:

<u>Claims</u>:

Column 13, Claim 2, line 26,
Change "Turner" to --Tuner--.

Column 13, Claim 3, line 30,
Change "Turner" to --Tuner--.

Column 13, Claim 4, line 34,
Change "Turner" to --Tuner--.

Column 14, Claim 5, line 13,
Change "Turner" to --Tuner--.

Column 14, Claim 6, line 16,
Change "Turner" to --Tuner--.

Column 14, Claim 7, line 18,
Change "Turner" to --Tuner--.

Column 14, Claim 8, line 21,
Change "Turner" to --Tuner--.

Column 14, Claim 9, line 26,
Change "Turner" to --Tuner--.

Column 14, Claim 10, line 29,
Change "Turner" to --Tuner--.

UNITED STATES PATENT AND TRADEMARK OFFICE
CERTIFICATE OF CORRECTION

PATENT NO. : 6,829,656 B1
APPLICATION NO. : 09/565110
DATED : December 7, 2004
INVENTOR(S) : Andreas Schwager et al.

It is certified that error appears in the above-identified patent and that said Letters Patent is hereby corrected as shown below:

Column 14, Claim 11, line 32,
Change "Turner" to --Tuner--.

This certificate supersedes the Certificate of Correction issued June 9, 2009.

Signed and Sealed this

Seventh Day of July, 2009

JOHN DOLL
*Acting Director of the United States Patent and Trademark Office*